(12) United States Patent
Hong

(10) Patent No.: US 11,018,440 B2
(45) Date of Patent: May 25, 2021

(54) APPARATUS AND METHOD FOR DETERMINING BEAM INDEX OF ANTENNA ARRAY

(71) Applicant: Samsung Electronics Co., Ltd., Gyeonggi-do (KR)

(72) Inventor: Seongbeom Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,981

(22) PCT Filed: Jan. 8, 2019

(86) PCT No.: PCT/KR2019/000289
§ 371 (c)(1),
(2) Date: Jul. 14, 2020

(87) PCT Pub. No.: WO2019/172518
PCT Pub. Date: Sep. 12, 2019

(65) Prior Publication Data
US 2021/0083400 A1 Mar. 18, 2021

(30) Foreign Application Priority Data
Mar. 6, 2018 (KR) .................. 10-2018-0026174

(51) Int. Cl.
*H04B 7/08* (2006.01)
*H01Q 21/06* (2006.01)
(Continued)

(52) U.S. Cl.
CPC ......... *H01Q 21/065* (2013.01); *H04B 7/0617* (2013.01); *H04B 7/08* (2013.01); *H04B 17/318* (2015.01)

(58) Field of Classification Search
CPC .... H04B 7/0617; H04B 7/0817; H04B 7/082; H04B 7/0825; H04B 7/0874
See application file for complete search history.

(56) References Cited

U.S. PATENT DOCUMENTS 9,572,079 B2 2/2017 Somayazulu et al.
9,653,818 B2 5/2017 Mohammadian et al.
(Continued)

FOREIGN PATENT DOCUMENTS

KR 10-2016-0147499 A 12/2016
KR 10-2017-0101310 A 9/2017
WO 2017/213295 A1 12/2017

OTHER PUBLICATIONS

US Lenovo, Motorola Mobility; "Remaining issues on beam measurement and reporting"; R1-1801826; 3GPP TSG RAN WG1 Meeting #92; Athens, Greece, Feb. 26-Mar. 2, 2018; https://www.3gpp.org/ftp/TSG_RAN/WG1_RL1/TSGR_92/Docs/.

*Primary Examiner* — Kevin Kim
(74) *Attorney, Agent, or Firm* — Cha & Reiter, LLC.

(57) ABSTRACT

An electronic device is disclosed. The electronic device includes a first antenna array including a plurality of first antenna elements, a second antenna array including a plurality of second antenna elements, and a processor. The processor measures first signal strengths for every a plurality of beam indexes by means of the first antenna array and the second antenna array, determines second signal strengths for every the plurality of beam indexes by means of the first antenna array, and determines a beam index, a signal strength of which is maximal, based on a difference between the first signal strength and the second signal strength corresponding to a beam index selected among the plurality of beam indexes.

15 Claims, 12 Drawing Sheets

(51) Int. Cl.
*H04B 7/06*       (2006.01)
*H04B 17/318*     (2015.01)

(56) References Cited

U.S. PATENT DOCUMENTS

| | | |
|---|---|---|
| 10,050,681 B2 | 8/2018 | Kim et al. |
| 2008/0151874 A1* | 6/2008 | Wynn .................. H04M 1/715 370/352 |
| 2014/0072078 A1* | 3/2014 | Sergeyev ................ H04B 7/08 375/316 |
| 2016/0315683 A1 | 10/2016 | Liu et al. |
| 2020/0153498 A1* | 5/2020 | Kotecha ............... H04B 7/0695 |
| 2020/0295817 A1* | 9/2020 | Loghin ................ H04B 7/0617 |

\* cited by examiner

APPARATUS AND METHOD FOR DETERMINING BEAM INDEX OF ANTENNA ARRAY

CROSS REFERENCE TO RELATED APPLICATIONS

This application is a National Phase Entry of PCT International Application No. PCT/KR2019/000289, which was filed on Jan. 8, 2019, and claims a priority to Korean Patent Application No. 10-2018-0026174, which was filed on Mar. 6, 2018, the contents of which are incorporated herein by reference.

TECHNICAL FIELD

Embodiments disclosed in the disclosure relate to an apparatus and method for determining a beam index of an antenna array.

BACKGROUND ART

With the commercialization of a 4th generation (4G) communication system, research has been conducted in a 5th generation (5G) communication system or a pre-5G communication system, which transmits and receives signals in a super high frequency (mmWave) band (e.g., 20 Gigahertz (GHz) or more), to meet wireless data traffic demands. To prevent path loss of signals in the super high frequency band and increase a transmission distances of signals, beamforming and antenna array technologies have been discussed in a next-generation (e.g., 5G) communication system.

The beamforming may refer to a technology of controlling such that a transmitted or received signal may have directionality. An electronic device may determine an optimal beam by receiving signals (or beams) for every a plurality of beam indexes via a plurality of antennas (or antenna arrays) and measuring signal strengths of the received beams. The operation of measuring the signal strengths for every beam indexes and determining the optimal beam in the electronic device may be referred to as a beam measurement operation.

DISCLOSURE

Technical Problem

The more increased the number of beam indexes, the more increased the time required for an electronic device to perform a beam measurement operation. Furthermore, when the electronic device moves while the beam measurement operation is performed, the beam measurement result before the electronic device moves and the beam measurement result after the electronic device moves may be changed.

Various embodiments of the disclosure are to provide an apparatus and method for efficiently determining a beam index using an antenna array.

Technical Solution

In accordance with an aspect of the disclosure, an electronic device is provided. The electronic device may include a first antenna array including a plurality of first antenna elements, a second antenna array including a plurality of second antenna elements; and a processor. The processor may be configured to measure first signal strengths for every a plurality of beam indexes by means of the first antenna array and the second antenna array, determine second signal strengths for every the plurality of beam indexes by means of the first antenna array, when a difference between the first signal strength and the second signal strength corresponding to a beam index selected among the plurality of beam indexes is greater than or equal to a specified first threshold, determine a beam index, the first signal strength of which is maximal, among the plurality of beam indexes, and when the difference between the first signal strength and the second signal strength is less than the first threshold, determine a beam index, the second signal strength of which is maximal, among the plurality of beam indexes.

In accordance with another aspect of the disclosure, an electronic device is provided. The electronic device may include a housing, an antenna structure including a first antenna array and a second antenna array, and a wireless communication circuitry configured to be operatively connected with the first antenna array and the second antenna array and transmit or receive a signal having a frequency between 3 Gigahertz (GHz) and 100 GHz by forming a directional beam using at least a part of the first antenna array or the second antenna array. The wireless communication circuitry may be configured to determine received signal strengths through a plurality of combinations of the first antenna array and the second antenna array, select one of the combinations based on at least some of the received signal strengths, determine a first received signal strength using the second antenna array, rather than the first antenna array, with respect to the selected combination, determine a second received signal strength using the second antenna array, rather than the first antenna array, with respect to the selected combination, and select one of the first antenna array and the second antenna array based on at least a portion of the first received signal strength and the second received signal strength.

In accordance with another aspect of the disclosure, an electronic device is provided. The electronic device may include a housing, an antenna structure including a first antenna array, a second antenna array, and a third antenna array, and a wireless communication circuitry configured to be operatively connected with the first antenna array, the second antenna array, and the third antenna array and transmit or receive a signal having a frequency between 3 GHz and 100 GHz by forming a directional beam using at least a part of the first antenna array, the second antenna array, or the third antenna array. The wireless communication circuitry may be configured to determine received signal strengths through a plurality of first combinations of the first antenna array and the second antenna array and through a plurality of second combinations of the first antenna array and the third antenna array, select one of the plurality of first combinations or the plurality of second combinations based on at least some of the received signal strengths, determine a first received signal strength using the second antenna array, rather than the first antenna array, with respect to the selected combination, determine a second received signal strength using the second antenna array, rather than the first antenna array, with respect to the selected combination, and select one of the first antenna array, the second antenna array, and the third antenna array based on at least a portion of the first received signal strength and the second received signal strength.

Advantageous Effects

According to embodiments disclosed in the disclosure, the electronic device may reduce a time required to determine a beam index by using a combination of a first antenna array and a second antenna array.

In addition, various effects ascertained directly or indirectly through the disclosure may be provided.

With regard to description of drawings, the same or similar denotations may be used for the same or similar components.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
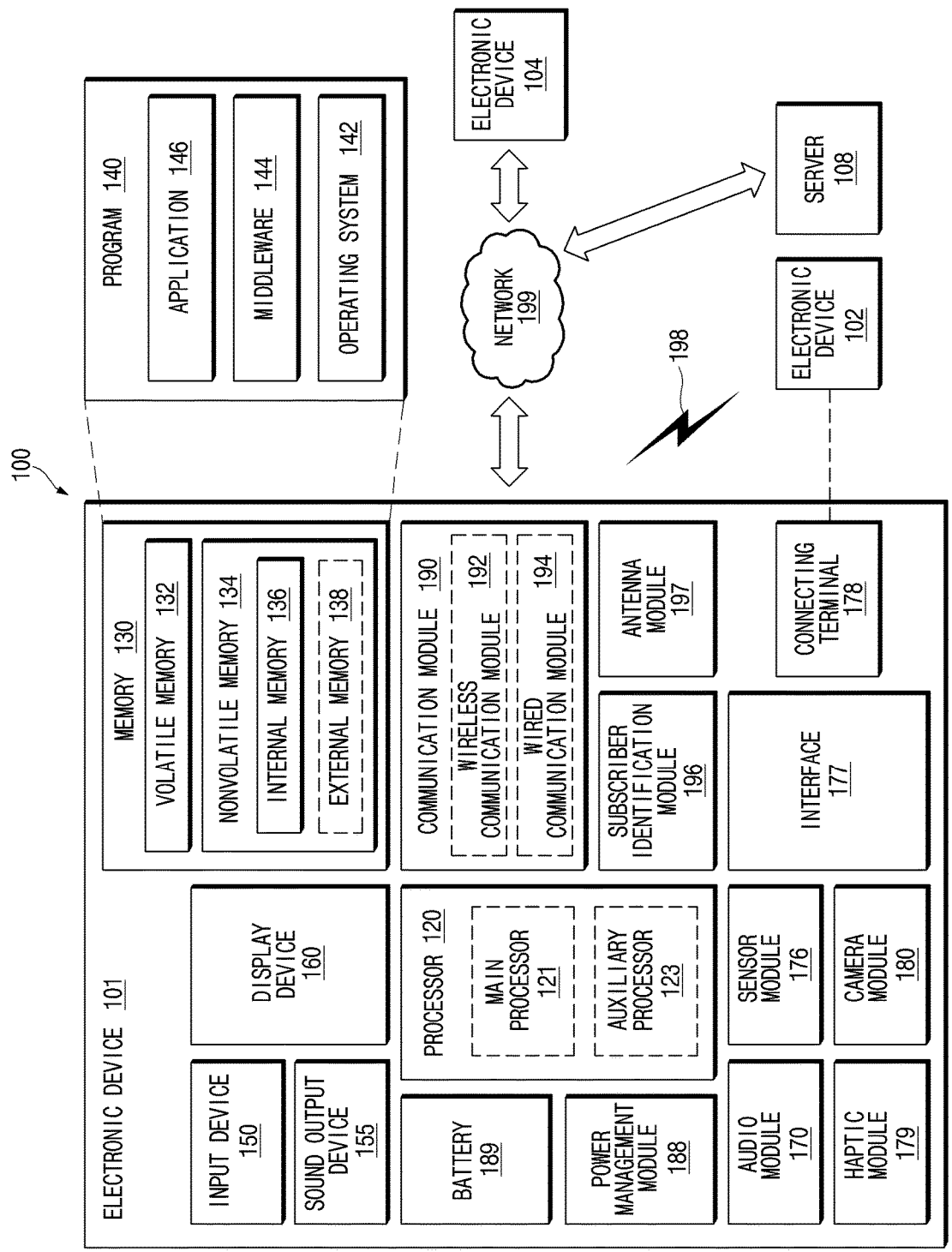
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
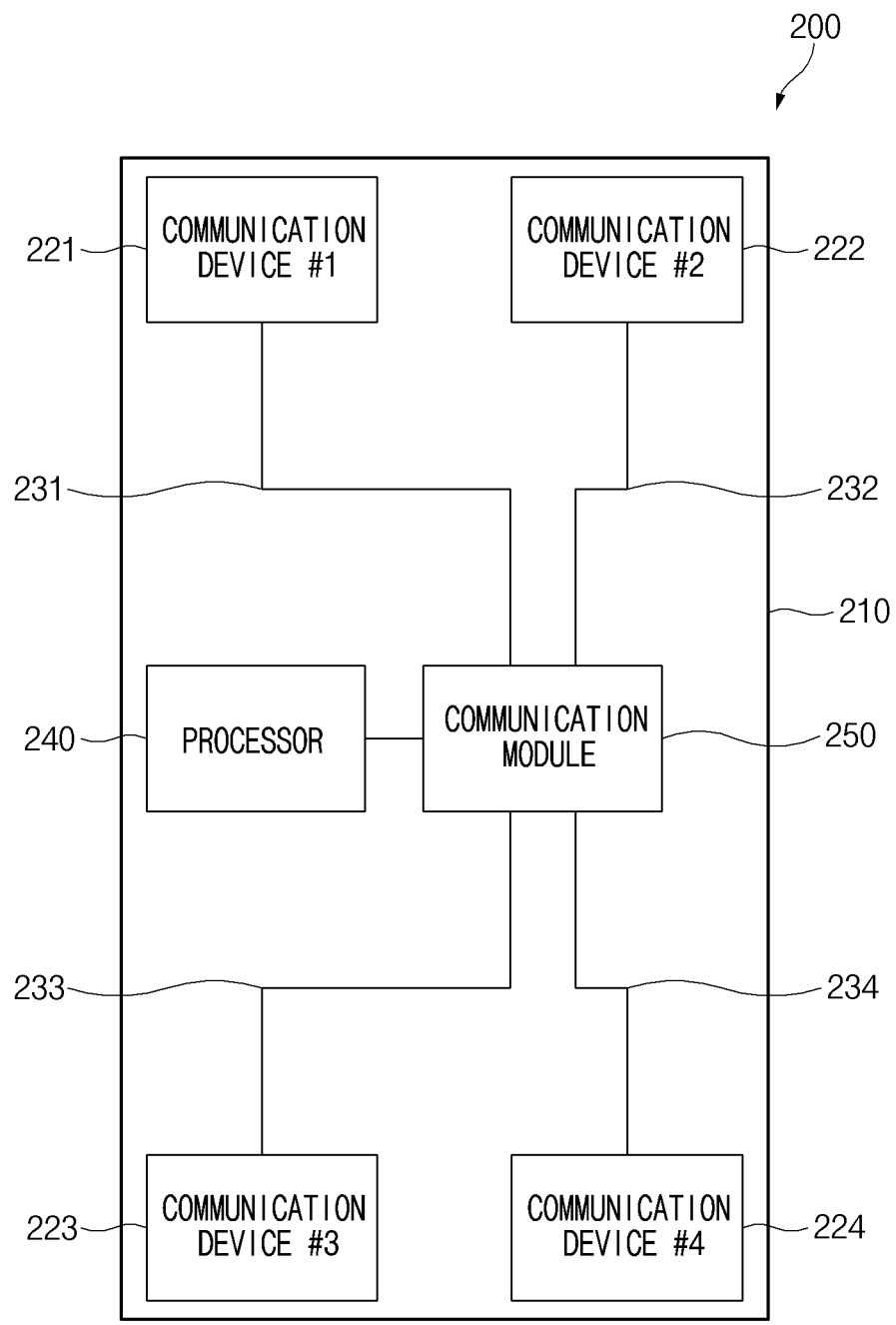
FIG. 2 illustrates a block diagram of an electronic device for supporting 5th generation (5G) communication according to various embodiments.

FIG. 2 illustrates a block diagram of an electronic device for supporting 5G communication according to various embodiments.

Referring to FIG. 2, an electronic device 200 (e.g., an electronic device 101 of FIG. 1) may include a housing 210, a processor 240 (e.g., a processor 120 of FIG. 1), a communication module 250 (e.g., a communication module 190 of FIG. 1), a first communication device 221, a second communication device 222, a third communication device 223, a fourth communication device 224, a first conductive line 231, a second conductive line 232, a third conductive line 233, or a fourth conductive line 234.

According to an embodiment, the housing 210 may protect other components of the electronic device 200. The housing 210 may include, for example, a front plate, a back plate facing away from the front plate, and a side member (or a metal frame) which is attached to the back plate or is integrated with the back plate and surrounds a space between the front plate and the back plate.

According to an embodiment, the electronic device 200 may include the first communication device 221, the second communication device 222, the third communication device 223, or the fourth communication device 224.

According to an embodiment, the first communication device 221, the second communication device 222, the third communication device 223, or the fourth communication device 224 may be located in the housing 210. According to an embodiment, as viewed from the top of the front plate of the electronic device, the first communication device 221 may be disposed at the top left of the electronic device 200, the second communication device 222 may be disposed at the top right of the electronic device 200, the third communication device 223 may be disposed at the bottom left of the electronic device 200, and the fourth communication device 224 may be disposed at the bottom right of the electronic device 200.

The configuration and number of the communication devices 221, 222, 223, and 224 is not limited to the shape of FIG. 2. According to an embodiment, the electronic device 200 may include the first communication device 221, the second communication device 222, and the third communication device 223. For example, on the basis of the front plate of the electronic device 200, the first communication device 221 may be disposed at the top left of the electronic device 200, the second communication device 222 may be disposed at the top right of the electronic device 200, and the third communication device 223 may be disposed at the left, middle, or right of the middle end (or bottom middle) of the electronic device 200. The electronic device 200 may include various numbers of communication devices in the housing 210 other than the number and locations of the above-mentioned communication devices 221, 222, 223, and 224, and the communication devices 221, 222, 223, and 224 may change in location in the housing 210 in various manners.

According to an embodiment, the processor 240 may include one or more of a central processing unit, an application processor (AP), a graphic processing unit (GPU), an image signal processor of a camera, a baseband processor (BP) (or a communication processor (CP)). According to an embodiment, the processor 240 may be implemented as a system on chip (SoC) or a system in package (SiP).

According to an embodiment, the communication module 250 may be electrically connected with the first communication device 221, the second communication device 222, the third communication device 223, or the fourth communication device 224 using the first conductive line 231, the second conductive line 232, the third conductive line 233, or the fourth conductive line 234. The communication module 250 may include a BP, a radio frequency integrated circuit (RFIC), or an intermediate frequency integrated circuit (IFIC). The communication module 250 may include a processor (e.g., a BP) independent of the processor 240 (e.g., the AP). The first conductive line 231, the second conductive line 232, the third conductive line 233, or the fourth conductive line 234 may include, for example, a coaxial cable or a flexible printed circuit board (FPCB).

According to an embodiment, the communication module 250 may include a first BP (not shown) or a second BP (not shown). The electronic device 200 may further include one or more interfaces for supporting inter-chip communication between the first BP (or the second BP) and the processor 240. The processor 240 and the first BP or the second BP may transmit and receive data using an inter-chip interface (e.g., an inter processor communication channel).

According to an embodiment, the first BP or the second BP may provide an interface for performing communication with other entities. The first BP may support wireless communication for, for example, a first network (not shown). The second BP may support wireless communication for, for example, a second network (not shown).

According to an embodiment, the first BP or the second BP may form one module with the processor 240. For example, the first BP or the second BP may be integrally formed with the processor 240. For another example, the first BP or the second BP may be disposed in one chip or may be formed in the form of an independent chip. According to an embodiment, the processor 240 and at least one BP (e.g., the first BP) may integrally formed in one chip (e.g., an SoC chip), and another BP (e.g., the second BP) may be formed in the form of an independent chip.

According to an embodiment, the first network (not shown) or the second network (not shown) may correspond to a network 199 of FIG. 1. According to an embodiment, the first network (not shown) or the second network (not shown)

may include a 4th generation (4G) network and a 5th generation (5G) network, respectively. The 4G network may support, for example, a long term evolution (LTE) protocol or long term evolution advanced (LTE-A), which is defined in the 3rd generation partnership project (3GPP). The 5G network may support, for example, a new ratio (NR) protocol defined by the 3GPP.

Figure 3:
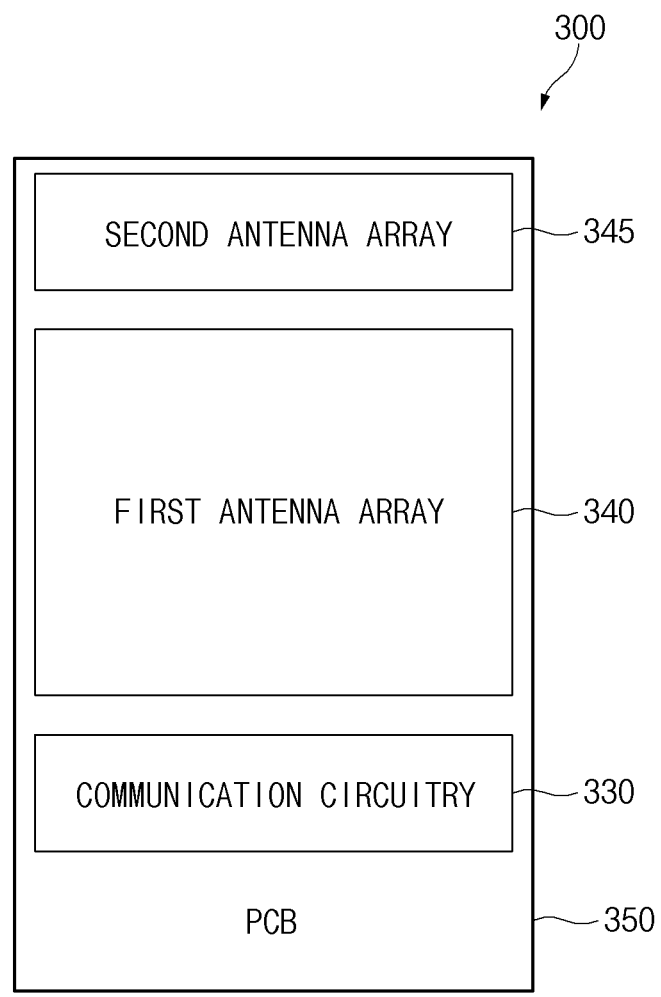
FIG. 3 illustrates a block diagram of a communication device according to various embodiments.

FIG. 3 illustrates a block diagram of a communication device according to various embodiments.

Referring to FIG. 3, a communication device 300 (e.g., a first communication device 221, a second communication device 222, a third communication device 223, or a fourth communication device 224 of FIG. 2) may include a communication circuitry 330 (e.g., an RFIC), a printed circuitry board (PCB) 350, or at least one antenna array (e.g., a first antenna array 340 or a second antenna array 345).

According to an embodiment, a communication circuitry or at least one antenna array may be located on the PCB 350. For example, the first antenna array 340 or the second antenna array 345 may be located on a first surface of the PCB 350 and the communication circuitry 330 may be located on a second surface of the PCB 350. The PCB 350 may include a coaxial cable connector or a board to board (B-to-B) connector for electrically connecting with another PCB (e.g., a PCB on which a communication module 250 of FIG. 2 is disposed) using a transmission line (e.g., conductive lines 231, 232, 233, and 234 of FIG. 2 or a coaxial cable). The PCB 350 may be connected with the PCB on which the communication module 250 is disposed by a coaxial cable using the coaxial cable connector, and the coaxial cable may be used to transmit a transmit and receive intermediate frequency (IF) signal or a transmit and receive radio frequency (RF) signal. For another example, power or the other control signals may be transmitted through the B-to-B connector.

According to an embodiment, the first antenna array 340 or the second antenna array 345 may include a plurality of antenna elements. The plurality of antenna elements may include a patch antenna (or a conductive plate) or a dipole antenna. For example, the antenna element included in the first antenna array 340 may be a patch antenna for forming a beam toward a back plate of an electronic device 200. For another example, the antenna element included in the second antenna array 345 may be a dipole antenna for forming a beam toward a side member of the electronic device 200. According to an embodiment, an antenna structure may include the first antenna array 340 or the second antenna array 345.

According to an embodiment, the communication circuitry 330 may support a radio frequency signal of 3 GHz to 100 GHz. According to an embodiment, the communication circuitry 330 may up-convert or down-convert a frequency. For example, the communication circuitry 330 included in the first communication device 221 may up-convert an IF signal received through the first conductive line 231 from the communication module 250. For another example, the communication circuitry 330 may down-convert a millimeter wave (mmWave) signal received through the first antenna array 340 or the second antenna array 345 included in the first communication device 221 and may transmit the down-converted signal to the communication module 250 using the first conductive line 231.

Figure 4:
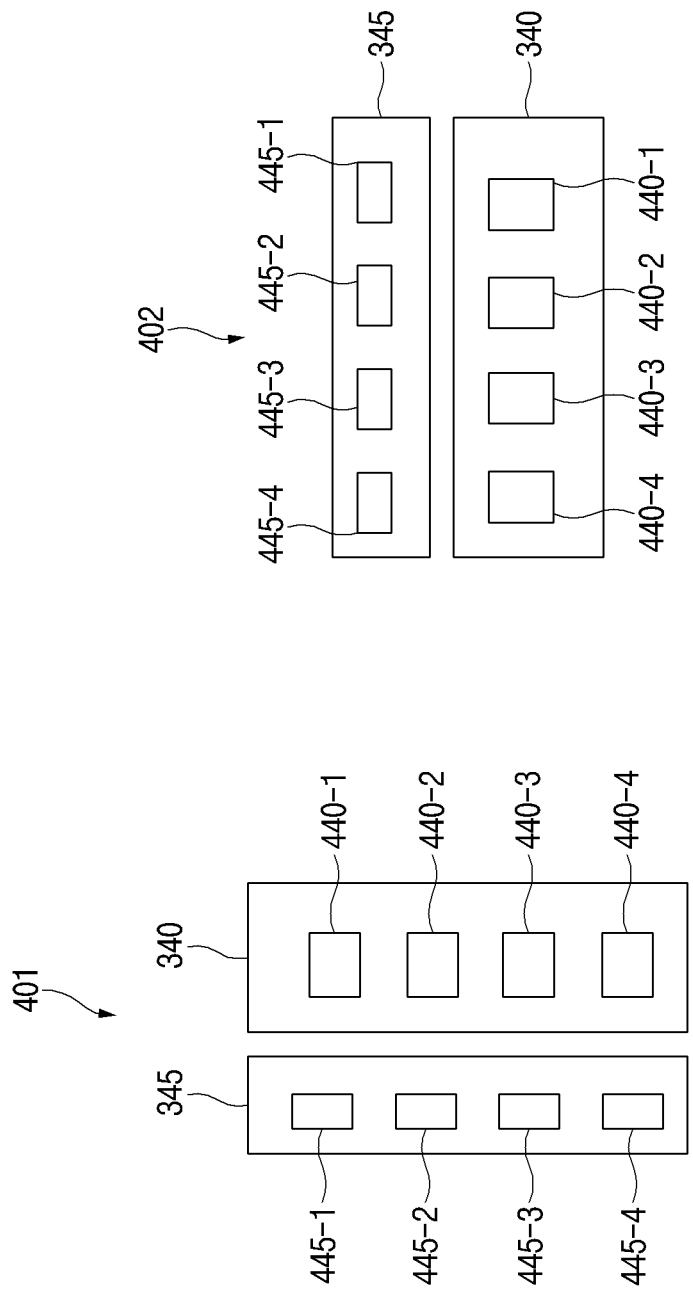
FIG. 4 illustrates an antenna array formed in one row and one column according to various embodiments.

FIG. 4 illustrates an antenna array formed in one row or one column according to various embodiments. The number of antenna elements shown in FIG. 4 is merely illustrative, and the antenna elements may be two or more in number.

Referring to FIG. 4, a first antenna array 340 or a second antenna array 345 may be formed in one column as shown in reference numeral 401 or may be formed in one row as shown in reference numeral 402. The first antenna array 340 may include a plurality of first antenna elements 440-1, 440-2, 440-3, and 440-4. According to an embodiment, the plurality of first antenna elements 440-1, 440-2, 440-3, and 440-4 may include a patch antenna. The second antenna array 345 may include a plurality of second antenna elements 445-1, 445-2, 445-3, and 445-4. According to an embodiment, the plurality of second antenna elements 445-1, 445-2, 445-3, and 445-4 may include a dipole antenna.

According to an embodiment, an electronic device 200 may control directionality (e.g., a phase) of a transmitted or received signal by using the plurality of first antenna elements 440-1, 440-2, 440-3, and 440-4 or the plurality of second antenna elements 445-1, 445-2, 445-3, and 445-4. In the disclosure, the technology where the electronic device 200 controls the directionality of the signal may be referred to as beamforming.

According to an embodiment, the electronic device 200 may measure a signal strength for each beam index by means of the first antenna array 340 or the second antenna array 345 (or a combination of the first antenna array 340 and the second antenna array 345) and may determine an optimal beam index based on the signal strength. The beam index may be a value indexing a group of a phase difference value corresponding to an angle of one beam in a look-up table which stores phase differences between signals for feeding power to respective antenna elements depending on the angle of the beam. The signal strength may include, for example, a signal to noise ratio (SNR), a signal to interference and noise ratio (SINR), a reference signals received power (RSRP), a received signal code power (RSCP), a beam reference signal received power (BRSRP), or a received signal strength indicator (RSSI).

In the disclosure, the signal strength measured by means of the first antenna array 340 and the second antenna array 345 may be referred to as a first signal strength (or a first received signal strength). For example, the electronic device 200 may enable the first antenna array 340 and the second antenna array 345 at the same time and may measure the first signal strength. In the disclosure, the signal strength measured by means of the first antenna array 340 may be referred to as a second signal strength (or a second received signal strength). For example, the electronic device 200 may measure the second signal strength by means of the first antenna array 340 in a state where the second antenna array 345 is disabled.

Figure 5:
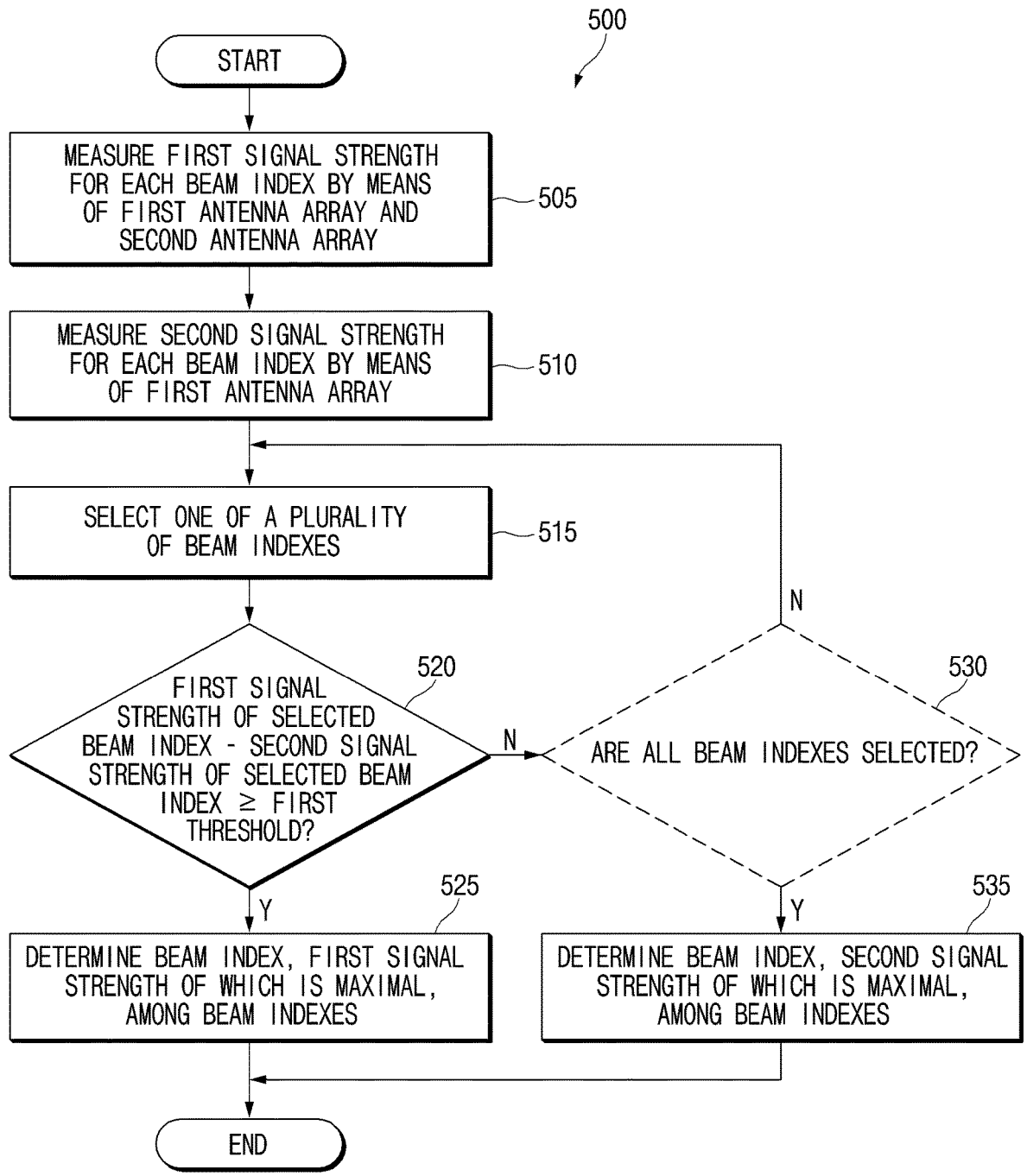
FIG. 5 illustrates an operational flowchart of an electronic device for determining a beam index based on a difference between signal strengths according to various embodiments.

FIG. 5 illustrates an operational flowchart of an electronic device 200 for determining a beam index based on a difference between signal strengths according to various embodiments. Operations described below may be performed by an electronic device 200, a processor 240, or a processor included in a communication module 250.

Referring to FIG. 5, in operation 505 of a method 500 for determining a beam index, the processor 240 may measure a first signal strength for each beam index by means of the first antenna array 340 or a second antenna array 345.

In operation 510, the processor 240 may measure a second signal strength for each beam index by means of the first antenna array 340. For example, the processor 240 may measure a signal strength in a state where the second antenna array 345 is disabled.

According to an embodiment, the first signal strength or the second signal strength may be represented as an SNR, an SINR, an RSRP, an RSCP, a BRSRP, or an RSSI. Although not illustrated in FIG. 5, the processor 240 may store first signal strength values or second signal strength values measured for each beam index.

In operation 515, the processor 240 may select one of a plurality of beam indexes. For example, the processor 240 may randomly select one of the plurality of beam indexes or may select a minimum beam index or a maximum beam index among the plurality of beam indexes.

In operation 520, the processor 240 may identify whether a difference between the first signal strength and the second signal strength corresponding to the selected beam index is greater than or equal to a specified first threshold. The first threshold value may be referred to as, for example, an offset. When the difference between the first signal strength and the second signal strength is greater than or equal to the first threshold, in operation 525, the processor 240 may determine a beam index, the first signal strength of which is maximal, among the beam indexes. For example, the processor 240 may determine a beam formed by means of the first antenna array 340 or the second antenna array 345 of FIG. 4. According to an embodiment, although not illustrated in FIG. 5, the processor 240 may determine a beam formed by means of only the second antenna array 345 among beam indexes, each of which has the maximum first signal strength. When the difference between the first signal strength and the second signal strength is less than the first threshold, the processor 240 may perform operation 530.

In operation 530, the processor 240 may identify whether to select all the beam indexes. When the processor 240 does not select all the beam indexes, it may repeatedly perform operation 515 and operation 520. When the processor 240 selects all the beam indexes, in operation 535, it may determine a beam index, the second signal strength of which is maximal, among the beam indexes. The beam index, the second signal strength of which is maximal, may indicate a beam formed by means of only the first antenna array 340 in a state where the second antenna array 345 of FIG. 4 is disabled. According to an embodiment, the processor 240 may perform operation 535 without performing operation 530. For example, when the difference between the first signal strength and the second signal strength is less than the first threshold, the processor 240 may determine the beam index, the second signal strength of which is maximal, among the beam indexes.

Through the above-mentioned method 500, the electronic device 200 may reduce a time taken to determine an optimal beam index.

Figure 6:
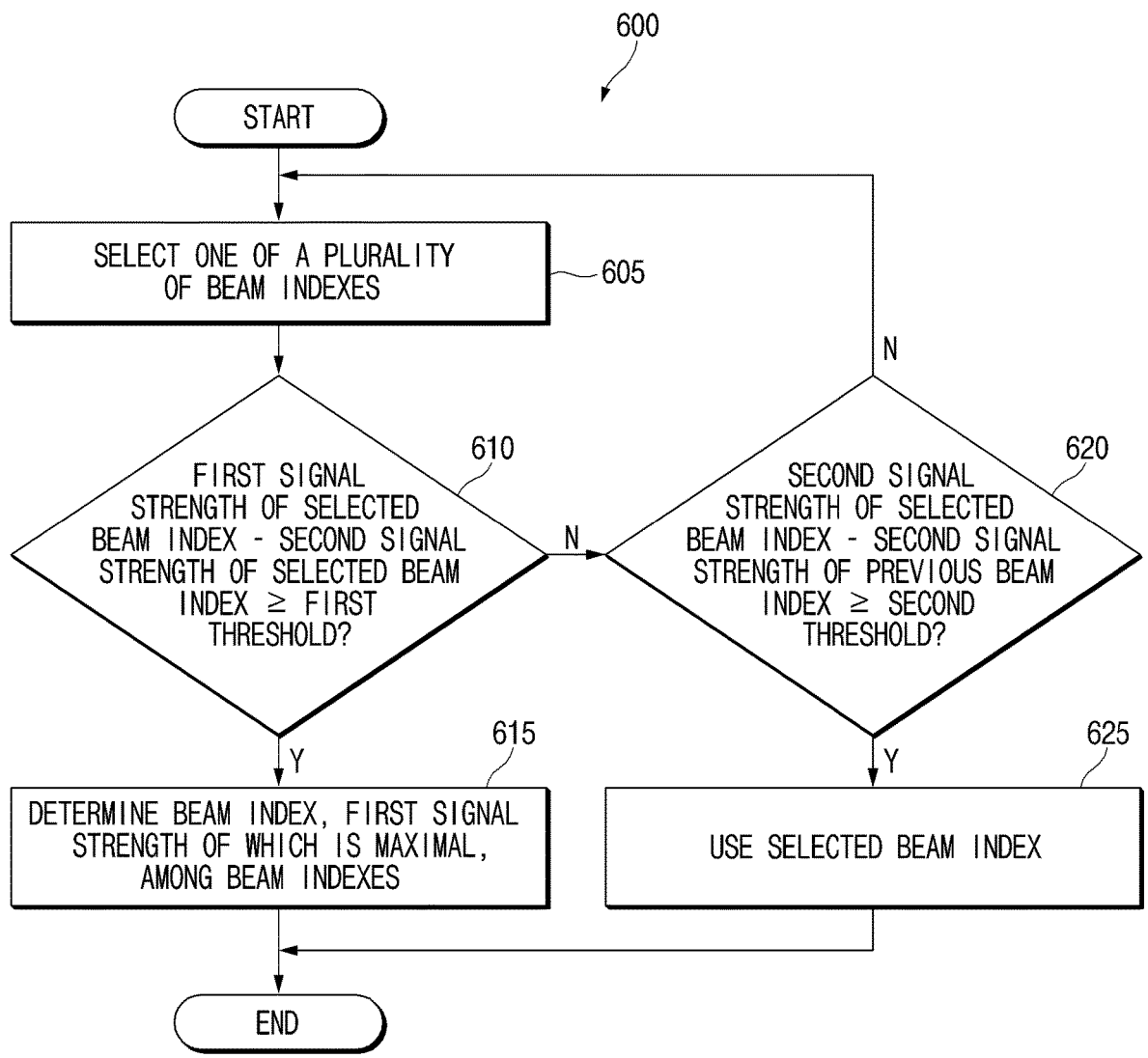
FIG. 6 illustrates an operational flowchart of an electronic device for determining a beam index based on a difference between a signal strength of a selected index and a signal strength of a previous index according to various embodiments.

FIG. 6 illustrates an operational flowchart of an electronic device 200 for determining a beam index based on a difference between a signal strength of a selected beam index and a signal strength of a previous beam index according to various embodiments. Operations shown in FIG. 6 may be performed after operation 505 and operation 510 of FIG. 5.

Referring to FIG. 6, in operation 605 of a method 600 for determining a beam index using a previous beam index, a processor 240 may select one of a plurality of beam indexes. In operation 610, the processor 240 may identify whether a difference between the first signal strength and the second signal strength corresponding to the selected beam index is greater than or equal to a specified first threshold. When the difference between the first signal strength and the second signal strength is greater than or equal to the first threshold, in operation 615, the processor 240 may determine a beam index, the first signal strength of which is maximal, among the plurality of beam indexes. For example, the processor 240 may determine a beam formed by means of a first antenna array 340 and a second antenna array 345 of FIG. 4. According to an embodiment, although not illustrated in FIG. 6, the processor 240 may determine a beam formed by means of only the second antenna array 345 among beam indexes, each of which has the maximum first signal strength. When the difference between the first signal strength and the second signal strength is less than the first threshold, the processor 240 may perform operation 620.

In operation 620, the processor 240 may identify whether a difference between the second signal strength of the selected beam index and the second signal strength of the previously selected beam index is greater than or equal to a specified second threshold. When the difference between the second signal strength of the selected beam index and the second signal strength of the previously selected beam index is less than the second threshold, the processor 240 may repeatedly perform operation 605 and operation 610 except for the previously selected beam index. When the difference between the second signal strength of the selected beam index and the second signal strength of the previously selected beam index is greater than or equal to the second threshold, in operation 625, the processor 240 may use the selected beam index. For example, the processor 240 may select the corresponding index (the selected index) as the best beam index at a current time.

According to an embodiment, in operation 620, the processor 240 may determine a beam index using a first signal strength value rather than a second signal strength value. When the difference between the first signal strength of the selected beam index and the first signal strength of the previously selected beam index is less than the second threshold, the processor 240 may repeatedly perform operation 605 and operation 610. When the difference between the first signal strength of the selected beam index and the first signal strength of the previously selected beam index is greater than or equal to the second threshold, the processor 240 may determine that the corresponding beam index is a beam index of a signal, the signal strength of which is maximal.

Figure 7:
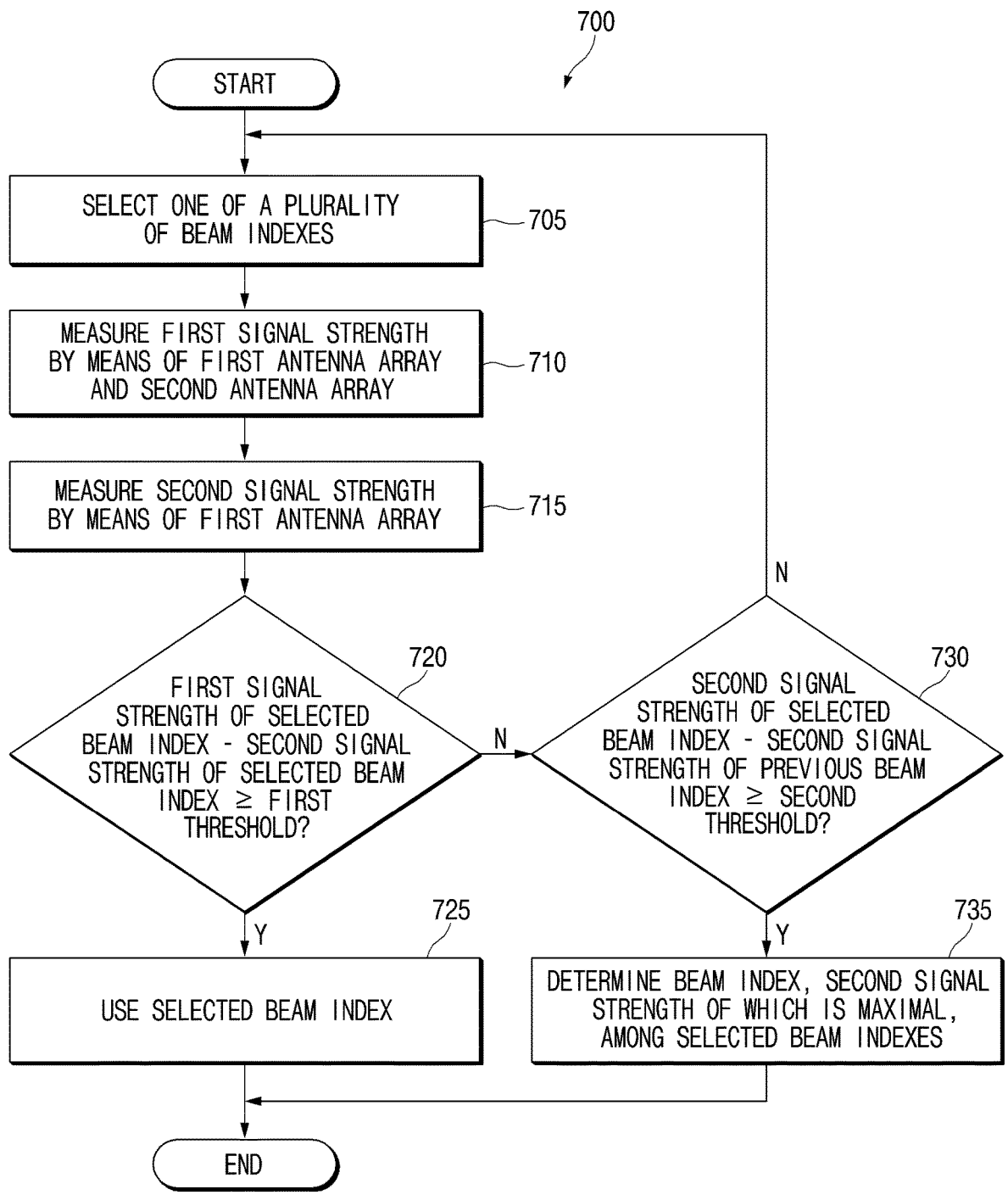
FIG. 7 illustrates an operational flowchart of an electronic device for determining a beam index by comparing signal strengths for every beam indexes according to various embodiments.

FIG. 7 illustrates an operational flowchart of an electronic device 200 for determining a beam index by comparing signal strengths for every beam indexes according to various embodiments. FIG. 7 illustrates an embodiment where the electronic device 200 compares a first signal strength with a second signal strength at the same time as measuring the first signal strength and the second signal strength for each beam index.

Referring to FIG. 7, in operation 705 of a method 700 for comparing signal strengths for every beam indexes, a processor 240 may select one of a plurality of beam indexes. For example, the processor 240 may randomly select one of the plurality of beam indexes or may select a minimum beam index or a maximum beam index among the plurality of beam indexes.

In operation 710, the electronic device 240 may measure the first signal strength for the selected beam index, by means of a first antenna array 340 and a second antenna array 345. For example, the electronic device 240 may enable the first antenna array 340 and the second antenna array 345 at the same time and may measure the first signal strength.

In operation 715, the processor 240 may measure a second signal strength for the selected beam index, by means of the first antenna array 340. For example, the processor 240 may measure the second signal strength by means of the first antenna array 340 in a state where the second antenna array 345 is disabled.

In operation 720, the processor 240 may identify whether a difference between the first signal strength and the second signal strength is greater than or equal to a specified first threshold. When the difference between the first signal strength and the second signal strength is greater than or equal to the first threshold, in operation 725, the processor 240 may use the selected beam index. For example, the processor 240 may determine a beam formed by means of the first antenna array 340 or the second antenna array 345 of FIG. 4. According to an embodiment, although not illustrated in FIG. 7, the processor 240 may determine a beam formed by means of only the second antenna array 345 among beam indexes, each of which has the maximum first signal strength. When the difference between the first signal strength and the second signal strength is less than the first threshold, the processor 240 may perform operation 730.

In operation 730, the processor 240 may identify whether a difference between the second signal strength of the selected beam index and the second signal strength of the previously selected beam index is greater than or equal to a specified second threshold. When the difference between the second signal strength of the selected beam index and the second signal strength of the previously selected beam index is less than the second threshold, the processor 240 may repeatedly perform operation 705, operation 710, operation 715, and operation 720. When the difference between the second signal strength of the selected beam index and the second signal strength of the previously selected beam index is greater than or equal to the specified second threshold, in operation 735, the processor 240 may select a beam index, the second signal strength of which is maximal, among the selected beam indexes. According to an embodiment, other than the second signal strength of the selected beam index and the second signal strength of the previously selected beam index, the processor 240 may compare the first signal strength of the selected beam with the first signal strength of the previously selected beam index.

Figure 8:
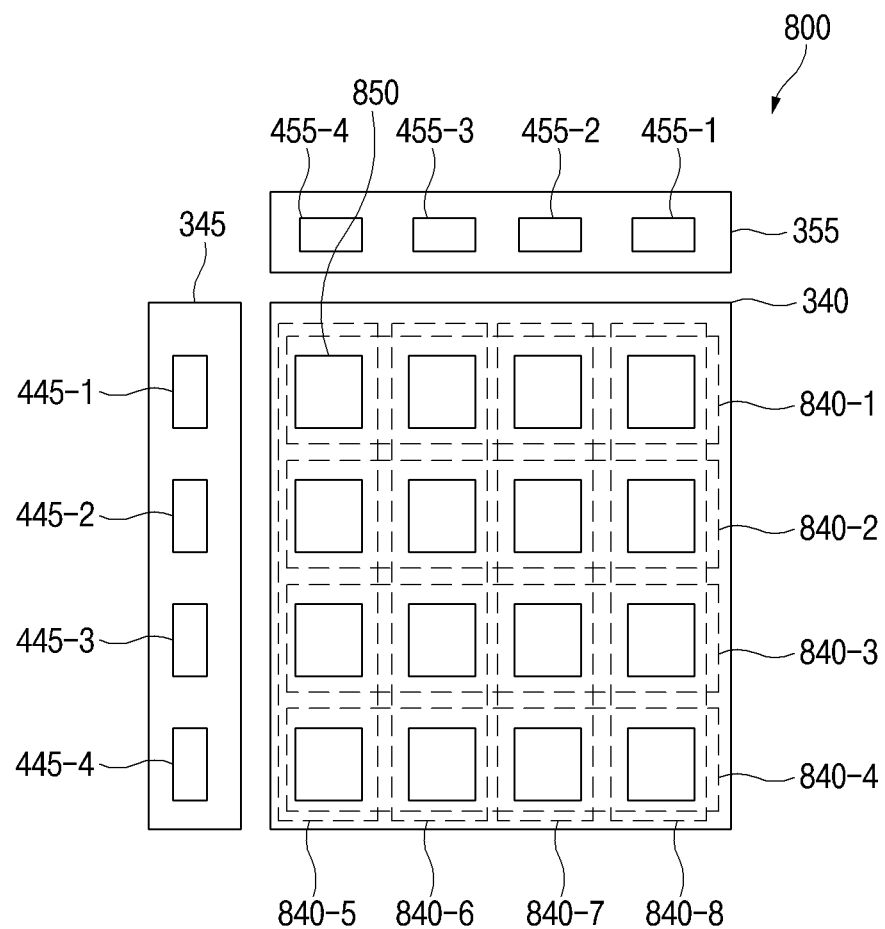
FIG. 8 illustrates an example of an antenna array formed in a plurality of rows and a plurality of columns according to various embodiments.

FIG. 8 illustrates an example of an antenna array formed in a plurality of rows and a plurality of columns according to various embodiments. The number of antenna elements, rows, and columns shown in FIG. 8 is merely illustrative, and the antenna elements, the rows, and the columns may be two or more in number.

Referring to FIG. 8, a communication device 800 (e.g., a communication device 300 of FIG. 3) may include a first antenna array 340, a second antenna array 345, or a third antenna array 355. The second antenna array 345 may include a plurality of second antenna elements 445-1, 445-2, 445-3, and 445-4 formed parallel to a column of the first antenna array 340. The third antenna array 355 may include a plurality of second antenna elements 455-1, 455-2, 455-3, and 455-4 formed parallel to a row of the first antenna array 340.

According to an embodiment, the first antenna array 340 may include first antenna element groups (e.g., a first antenna element group 840-1, 840-2, 840-3, or 840-4) formed in row and second antenna element groups (e.g., a second antenna element group 840-5, 840-6, 840-7, or 840-8) formed in column. The number of antenna elements (e.g., an antenna element 850) included in the first antenna element group or the second antenna element group, the number of first antenna element groups, or the number of second antenna element groups is not limited to the example shown in FIG. 8.

According to an embodiment, an electronic device 200 may measure a signal strength for each first beam index group or each second beam index group. The beam index group may indicate, for example, a beam formed in a horizontal direction or a beam formed in a vertical direction. For example, when forming a beam in the horizontal direction (when forming a beam corresponding to the first beam index group), the electronic device 200 may enable at least one of the first antenna element groups 840-1, 840-2, 840-3, and 840-4 formed in row in the first antenna array 340 and at least one of the second antenna elements 445-1, 445-2, 445-3, and 445-4 included in the second antenna array 345 and may measure a received signal strength. For another example, when forming a beam in the vertical direction (when forming a beam corresponding to the second beam index group), the electronic device 200 may enable at least one of the second antenna element groups 840-5, 840-6, 840-7, and 840-8 formed in column in the first antenna array 340 and at least one of the second antenna elements 455-1, 455-2, 455-3, and 455-4 included in the third antenna array 355 and may measure a received signal strength.

According to an embodiment, the electronic device 200 may determine a beam index, a signal strength of which is maximal, based on a first beam index group, a signal strength of which is maximal, among a plurality of first beam index groups and a second beam index group, a signal strength of which is maximal, among a plurality of second beam index groups. For example, when a signal strength of the first beam index group corresponding to the first antenna element group 840-1 among the first beam groups is maximal and when a signal strength of the second beam index group corresponding to the antenna element group 840-2 among the second beam index groups is maximal, the electronic device 200 may determine a beam index of the antenna element 850, in which the antenna element group 840-1 and the antenna element group 840-2 cross, as an optimal beam index.

Figure 9:
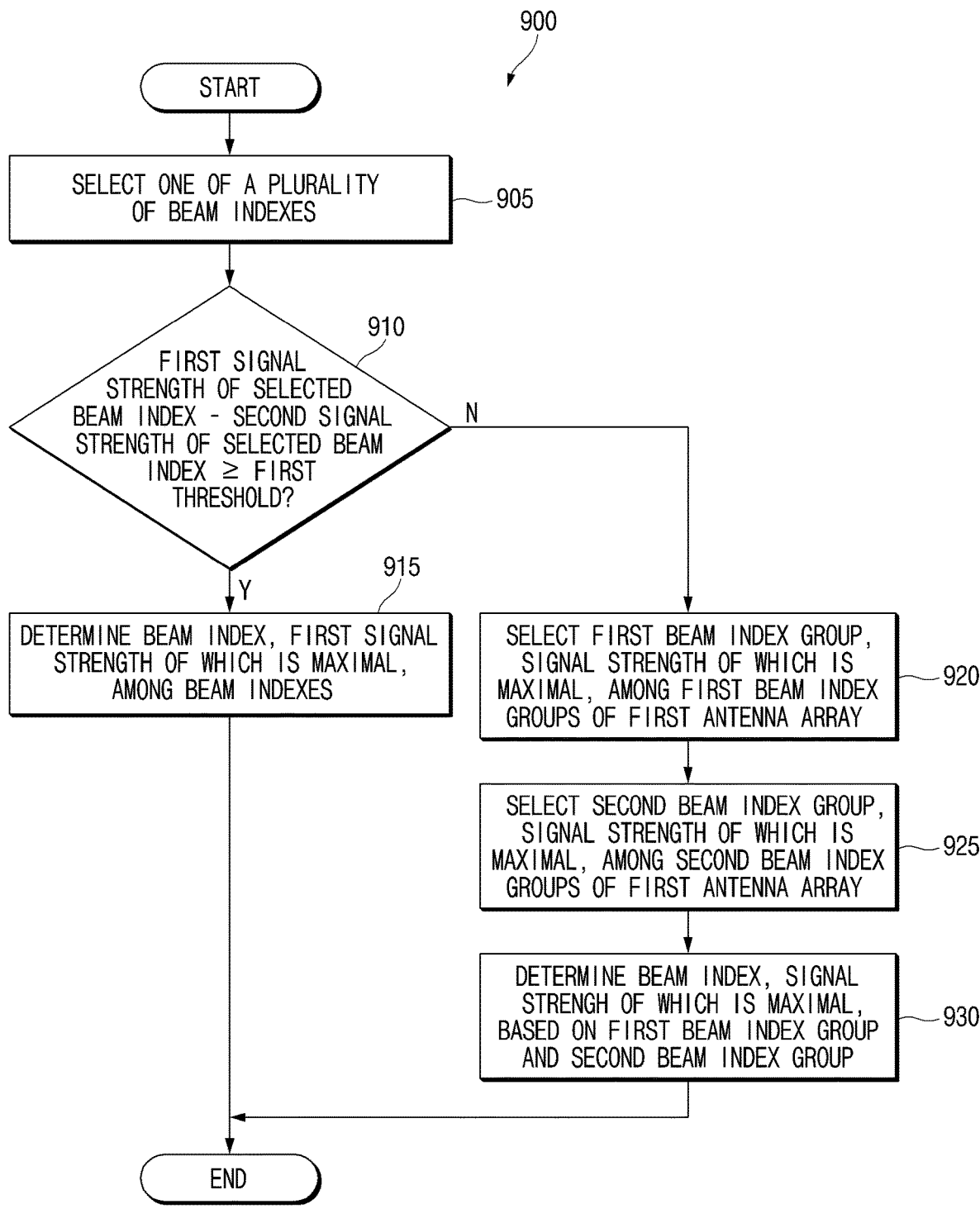
FIG. 9 illustrates an operational flowchart of an electronic device for determining a beam index based on a signal strength of a first beam index group formed in row and a signal strength of a second beam index group formed in column according to various embodiments.

FIG. 9 illustrates an operational flowchart of an electronic device for determining a beam index based on a signal strength of a first beam index group formed in row and a signal strength of a second beam index group formed in column according to various embodiments. Operations shown in FIG. 9 may be performed after operation 505 and operation 510 of FIG. 5.

Referring to FIG. 9, in operation 905 of a method 900, a processor 240 may select one of a plurality of beam indexes. In operation 910, the processor 240 may identify whether a difference between a first signal strength and a second signal strength corresponding to a selected beam index is greater than or equal to a specified first threshold. When the difference between the first signal strength and the second signal strength is greater than or equal to the first threshold, in operation 915, the processor 240 may determine a beam index, the first signal strength of which is maximal, among the beam indexes. For example, the processor 240 may determine a beam formed by means of a first antenna array 340 or a second antenna array 345 of FIG. 4. According to an embodiment, although not illustrated in FIG. 9, the processor 240 may determine a beam formed by means of only the second antenna array 345 among beam indexes, each of which has the maximum first signal strength. When the difference between the first signal strength and the second signal strength is less than the first threshold, the processor 240 may perform operation 920.

In operation 920, the processor 240 may select a first beam index group, a signal strength (e.g., the first signal strength or the second signal strength) of which is maximal, among a plurality of first beam index groups. In operation 925, the processor 240 may select a second beam index group, a signal strength of which is maximal, among a plurality of second beam index groups. In operation 930, the processor 240 may determine an optimal beam index based on the first beam index group, the signal strength of which is maximal, and the second beam index group, the signal strength of which is maximal. For example, the processor 240 may determine a beam index in which the first beam index group, the signal strength of which is maximal, and the second beam index group, the signal strength of which is maximal, cross.

Figure 10:
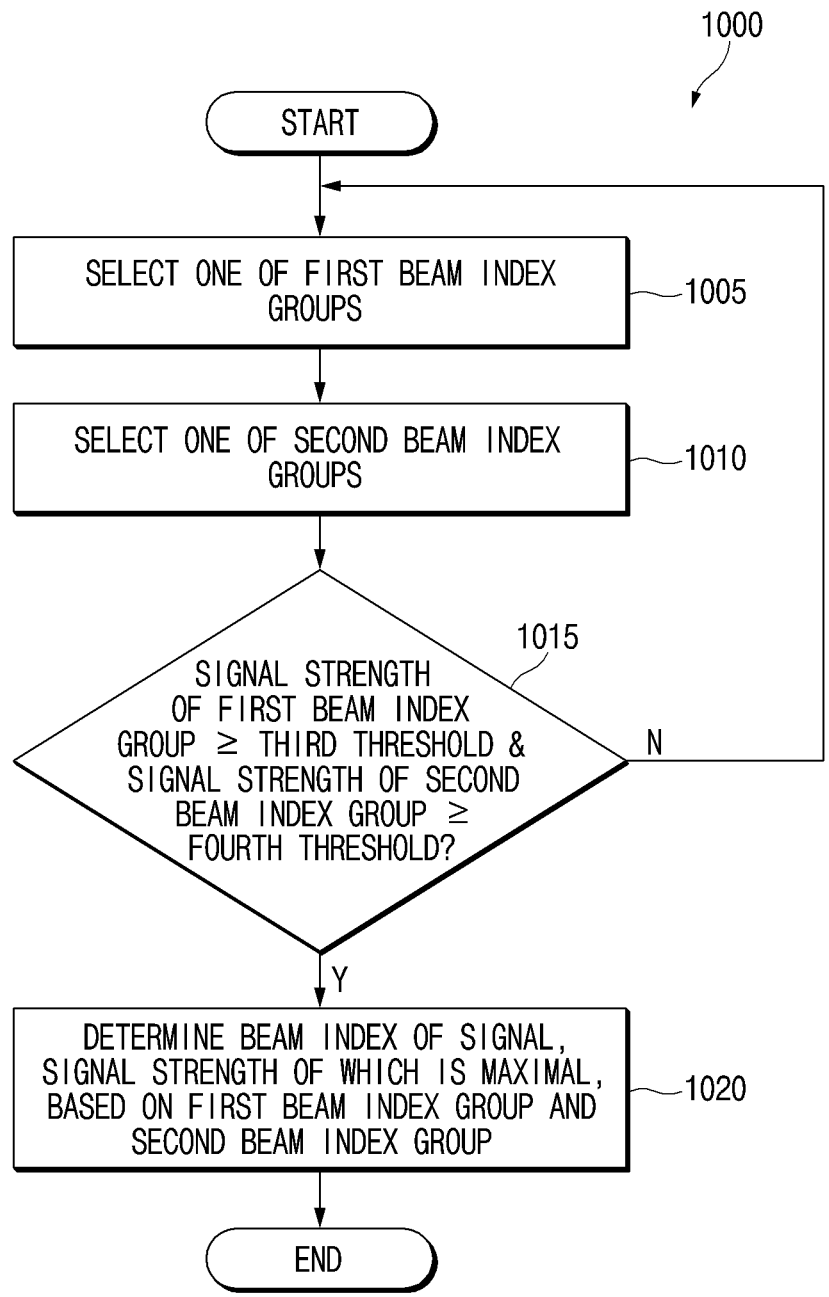
FIG. 10 illustrates an operational flowchart of an electronic device for determining a beam index by comparing a signal strength with a threshold for each beam index group according to various embodiments.

FIG. 10 illustrates an operational flowchart of an electronic device for determining a beam index by comparing a signal strength with a threshold for each beam index group according to various embodiments. Operations shown in FIG. 10 may be performed after operation 505 and operation 510 of FIG. 5.

Referring to FIG. 10, in operation 1005 of a method 1000, a processor 240 may select one of first beam index groups. In operation 1005, the processor 240 may select one of second beam index groups.

In operation 1015, the processor 240 may identify whether a signal strength of the first beam index group is greater than or equal to a specified third threshold and whether a signal strength of the second beam index group is greater than or equal to a specified fourth threshold. When at least one of the two conditions is not met, the processor 240 may repeatedly perform operation 1005, operation 1010, and operation 1015. When both the two conditions are met, the processor 240 may perform operation 1020.

In operation 1020, the processor 240 may determine a beam index of a signal, a signal strength of which is maximal, based on the selected first beam index group and the selected second beam index group. For example, the processor 240 may determine a beam index in which the first beam index group and the second beam index group cross.

Figure 11:
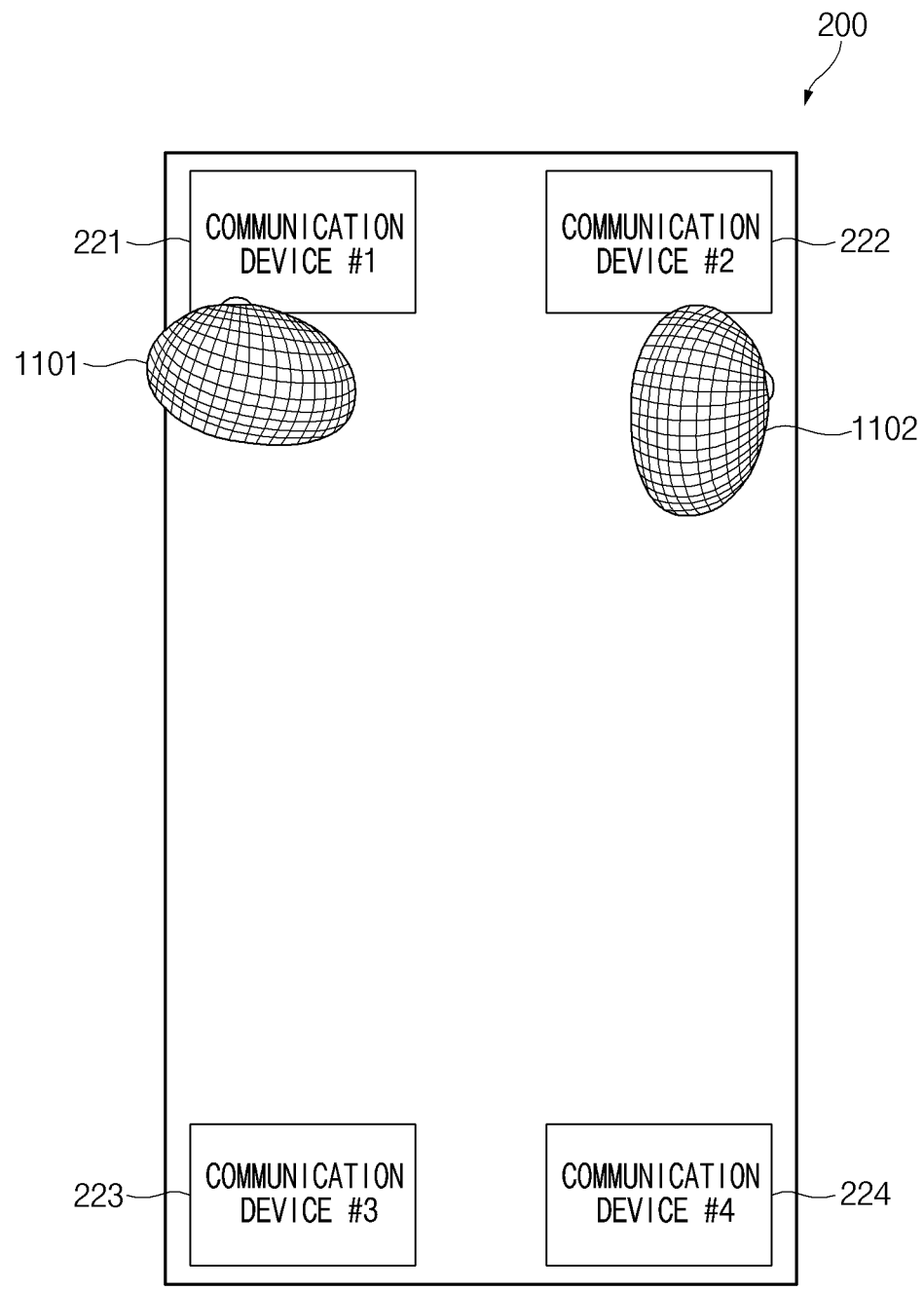
FIG. 11 illustrates a block diagram of an electronic device for supporting diversity according to various embodiments.

FIG. 11 illustrates a block diagram of electronic device for supporting diversity according to various embodiments.

Referring to FIG. 11, an electronic device 200 may support diversity. For example, the electronic device 200 may assign only a beam 1101 in a horizontal form to a first communication device 221 and may assign only a beam 1102 in a vertical form to a second communication device 222. FIG. 11 illustrates an embodiment where the diversity technology is applied to the first communication device 221 and the second communication device 222, but a similar principle is applicable to a third communication device 223 and a fourth communication device 224.

Figure 12:
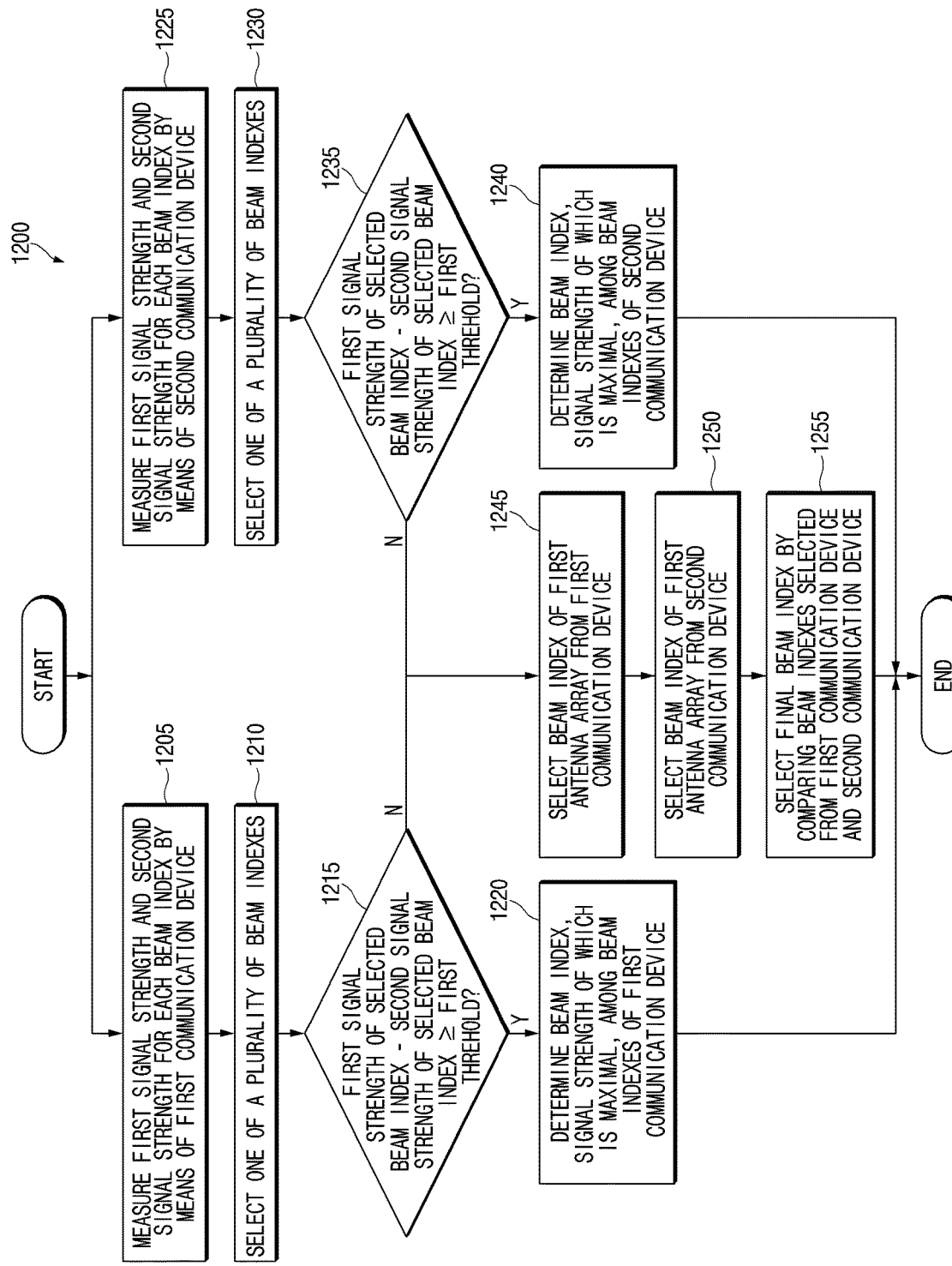
FIG. 12 illustrates an operational flowchart of an electronic device for determining a beam index based on signal strengths of a plurality of communication devices according to various embodiments.

FIG. 12 illustrates an operational flowchart of an electronic device 200 for determining a beam index based on signal strengths of a plurality of communication devices according to various embodiments.

Referring to FIG. 12, in operation 1205 of a method 1200, a processor 240 may measure a first signal strength and a second signal strength for each beam index by means of a first communication device 221. For example, the processor 240 may measure the first signal strength by means of a first antenna array (e.g., a first antenna array 340 of FIG. 4) and a second antenna array (e.g., a second antenna array 345 of FIG. 4) and may measure the second signal strength by means of the first antenna array. In operation 1210, the processor 240 may select one of a plurality of beam indexes. In operation 1215, the processor 240 may identify whether a difference between the first signal strength and the second signal strength corresponding to the selected beam index is greater than or equal to a first threshold. When the difference between the first signal strength and the second signal strength is greater than or equal to the first threshold, in operation 1220, the processor 240 may determine a beam index of a signal, a signal strength of which is maximal, among the first signal strengths measured by means of the first communication device 221.

According to an embodiment, the processor 240 may determine a beam index by means of a second communication device 222 by applying a principle similar to operations 1205 to 1220. In operation 1225, the processor 240 may measure a first signal strength and a second signal strength for each beam index by means of the second communication device 222. In operation 1230, the processor 240 may select one of a plurality of beam indexes. In operation 1235, the processor 240 may identify whether a difference between the first signal strength and the second signal strength corresponding to the selected beam index is greater than the first threshold. When the difference between the first signal strength and the second signal strength is greater than or equal to the first threshold, in operation 1240, the processor 240 may determine a beam index of a signal, a signal strength of which is maximal, among the first signal strengths measured by means of the second communication device 222.

According to an embodiment, operations 1205 to 1220 performed using the first communication device 221 and operations 1225 to 1240 performed using the second communication 222 device may be performed at the same time. According to another embodiment, the processor 240 may perform operations 1225 to 1240 after performing operations 1205 to 1220. According to another embodiment, the processor 240 may perform operations 1205 to 1220 after performing operations 1225 to 1240.

According to an embodiment, when the difference between the first signal strength and the second signal strength measured by means of the first communication device 221 is less than the first threshold and when the difference between the first signal strength and the second signal strength measured by means of the second communication device 222 is less than the first threshold, the processor 240 may perform operation 1245.

In operation 1245, the processor 240 may determine a beam index, a signal strength of which is maximal, by means of the first antenna array in the first communication device 221. For example, as described in FIG. 5, the processor 240 may determine an optimal beam index based on the difference between the first signal strength and the second signal strength. For another example, as described in FIG. 6, the processor 240 may determine an optimal beam index based on a difference between a signal strength (e.g., the first signal strength or the second signal strength) of the selected beam index and a signal strength of a previous beam index. For another example, when the first antenna array is formed in a plurality of rows and a plurality of columns, as shown in FIG. 9, the processor 240 may determine an optimal beam index by comparing an optimal first beam index group with an optimal second beam index group. For another example, when the first antenna array is formed in the plurality of rows and the plurality of columns, as shown in FIG. 10, the processor 240 may determine an optimal beam index based on whether each of a signal strength of the selected first beam index group and a signal strength of the selected second beam index group is greater than or equal to a specified threshold (e.g., a third threshold or a fourth threshold).

In operation 1250, the processor 240 may determine a beam index, a signal strength of which is maximal, by means of the first antenna array in the second communication device 222. For example, the processor 240 may determine an optimal beam index based on a difference between the first signal strength and the second signal strength, based on a difference between a signal strength (e.g., the first signal strength or the second signal strength) of the selected beam index and a signal strength of the previous beam index, or by comparing an optimal first beam index group with an optimal second beam index group, or based on whether each of a signal strength of the selected first beam index group and a signal strength of the selected second beam index group is greater than or equal to a specified threshold.

In operation 1225, the processor 240 may determine an optimal beam index by comparing the beam index selected by the first communication device 221 with the beam index selected by the second communication device 222.

As described above, an electronic device (e.g., an electronic device 101 of FIG. 1) may include a first antenna array (e.g., a first antenna array 340 of FIG. 3) including a plurality of first antenna elements (e.g., first antenna elements 440-1, 440-2, 440-3, and 440-4 of FIG. 4), a second antenna array (e.g., a second antenna array 345 of FIG. 3) including a plurality of second antenna elements (e.g., second antenna elements 445-1, 445-2, 445-3, and 445-4 of FIG. 4), and a processor (e.g., a processor 120 of FIG. 1). The processor may be configured to measure first signal strengths for every a plurality of beam indexes by means of the first antenna array and the second antenna array, measure second signal strengths for every the plurality of beam indexes by means of the first antenna array, when a difference between the first signal strength and the second signal strength corresponding to a beam index selected among the plurality of beam indexes is greater than or equal to a specified first threshold, determine a beam index, the first signal strength of which is maximal, among the plurality of beam indexes, and, when the difference between the first signal strength and the second signal strength is less than the first threshold, determine a beam index, the second signal strength of which is maximal, among the plurality of beam indexes.

According to an embodiment, the signal strength may include a signal to noise ratio (SNR), a reference signals received power (RSRP), a received signal code power (RSCP), a BRSRP, or a received signal strength indicator (RSSI).

According to an embodiment, the plurality of first antenna elements may include a patch antenna and the plurality of second antenna elements may include a dipole antenna.

According to an embodiment, the processor may be configured to, when the difference between the first signal strength and the second signal strength is less than the first threshold, identify whether all the plurality of beam indexes are selected, and, when all the plurality of beam indexes are selected, determine the beam index, the second signal strength of which is maximal, among the plurality of beam indexes.

According to an embodiment, the processor may be configured to, when the difference between the first signal strength and the second signal strength is less than the first threshold, identify whether a difference between the second signal strength of the selected beam index and the second signal strength of a previous beam index is greater than or equal to a specified second threshold, when the difference between the second signal strength of the selected beam index and the second signal strength of the previous beam index is greater than or equal to the second threshold, determine the beam index, the second signal strength of which is maximal, among the plurality of beam indexes, and, when the difference between the second signal strength of the selected beam index and the second signal strength of the previous beam index is less than the second threshold, determine the selected beam index as a beam index, a signal strength of which is maximal.

According to an embodiment, the first antenna array may include antenna elements (e.g., first antenna element groups 840-1, 840-2, 840-3, and 840-4) formed in a plurality of rows and antenna elements (e.g., second antenna element groups 840-5, 840-6, 840-7, and 840-8) formed in a plurality of columns. The processor may be configured to, when the difference between the first signal strength and the second signal strength is less than the first threshold, determine a first beam index group, a signal strength of which is maximal, among first beam index groups corresponding to antenna elements formed in row, determine a second beam index group, a signal strength of which is maximal, among second beam index groups corresponding to antenna elements formed in column, and determine a beam index, a signal strength of which is maximal, based on the determined first beam index group and the determined second beam index group.

According to an embodiment, the first antenna array may include antenna elements formed in a plurality of rows and antenna elements formed in a plurality of columns. The processor may be configured to, when the difference between the first signal strength and the second signal strength is less than the first threshold, select one of first beam index groups corresponding to antenna elements formed in row, select one of second beam index groups corresponding to antenna elements formed in column, and, when a signal strength of the selected first beam index group is greater than or equal to a specified third threshold and when a signal strength of the selected second beam index group is greater than or equal to a specified fourth threshold, determine a beam index, a signal strength of which is maximal, based on the selected first beam index group and the selected second beam index group.

According to an embodiment, the electronic device may further include a third antenna array (e.g., a third antenna array 355 of FIG. 8) including a plurality of third antenna elements (e.g., second antenna elements 455-1, 455-2, 455-3, and 455-4 of FIG. 8). The processor may be configured to, when the difference between the first signal strength and the second signal strength is less than the first threshold, select a beam index, a signal strength of which is maximal, in the first antenna array, select a beam index, a signal strength of which is maximal, in the third antenna array, and determine a beam index, a signal strength of which is maximal, between the beam index selected from the first antenna array and the beam index selected from the third antenna array.

As described above, an electronic device (e.g., an electronic device 101 of FIG. 1) may include a housing (e.g., a housing 210 of FIG. 2), an antenna structure including a first antenna array (e.g., a first antenna array 340 of FIG. 3) and a second antenna array (e.g., a second antenna array 345 of FIG. 3), and a wireless communication circuitry (e.g., a communication circuitry 330 of FIG. 3) configured to be operatively connected with the first antenna array and the second antenna array and transmit or receive a signal having a frequency between 3 Gigahertz (GHz) and 100 GHz by forming a directional beam using at least a part of the first antenna array or the second antenna array. The wireless communication circuitry may be configured to determine received signal strengths through a plurality of combinations of the first antenna array and the second antenna array, select one of the combinations based on at least some of the received signal strengths, determine a first received signal strength using the second antenna array, rather than the first antenna array, with respect to the selected combination, determine a second received signal strength using the second antenna array, rather than the first antenna array, with respect to the selected combination, and select one of the first antenna array and the second antenna array based on at least a portion of the first received signal strength and the second received signal strength.

According to an embodiment, the first antenna array may be located on a first plane and the second antenna array may be located on a second plane different from the first plane.

According to an embodiment, the first antenna array may include a plurality of conductive plates and the second antenna array may include a plurality of dipole antennas.

According to an embodiment, the first antenna array may be oriented to generate a beam in a first direction and the second antenna array may be oriented to generate a beam in a second direction different from the first direction.

According to an embodiment, the first direction may be substantially perpendicular to the second direction.

According to an embodiment, the first received signal strength or the second received signal strength may include an SNR, an RSRP, an RSCP, a BRSRP, or an RSSI.

According to an embodiment, the first antenna array may include antenna elements (e.g., first antenna element groups 840-1, 840-2, 840-3, and 840-4 of FIG. 8) formed in a plurality of rows and antenna elements (e.g., second antenna element groups 840-5, 840-6, 840-7, and 840-8 of FIG. 8) formed in a plurality of columns. The wireless communication circuitry may be configured to, when a difference between the first received signal strength and the second received signal strength is less than a first threshold, determine a first beam index group, a signal strength of which is maximal, among first beam index groups corresponding to antenna elements formed in row, determine a second beam index group, a signal strength of which is maximal, among second beam index groups corresponding to antenna elements formed in column, and determine a beam index, a signal strength of which is maximal, based on the determined first beam index group and the determined second beam index group.

As described above, an electronic device (e.g., an electronic device 101 of FIG. 1) may include a housing (e.g., a housing 210 of FIG. 2), an antenna structure including a first antenna array (e.g., a first antenna array 340 of FIG. 3), a second antenna array (e.g., a second antenna array 345 of FIG. 3), and a third antenna array (e.g., a third antenna array 355 of FIG. 8), and a wireless communication circuitry (e.g., a communication circuitry 330 of FIG. 3) configured to be operatively connected with the first antenna array, the second antenna array, and the third antenna array and transmit or receive a signal having a frequency between 3 GHz and 100 GHz by forming a directional beam using at least a part of the first antenna array, the second antenna array, or the third antenna array. The wireless communication circuitry may be configured to determine received signal strengths through a plurality of first combinations of the first antenna array and the second antenna array and through a plurality of second combinations of the first antenna array and the third antenna array, select one of the plurality of first combinations or the plurality of second combinations based on at least some of the received signal strengths, determine a first received signal strength using the second antenna array, rather than the first antenna array, with respect to the selected combination, determine a second received signal strength using the second antenna array, rather than the first antenna array, with respect to the selected combination, and select one of the first antenna array, the second antenna array, and the third antenna array based on at least a portion of the first received signal strength and the second received signal strength.

According to an embodiment, the first antenna array may be located on a first plane and the second antenna array may be located on a second plane different from the first plane.

According to an embodiment, the first antenna array may include a plurality of conductive plates and the second antenna array and the third antenna array may include a plurality of dipole antennas.

According to an embodiment, the first antenna array may be oriented to generate a beam in a first direction, the second antenna array may be oriented to generate a beam in a second direction different from the first direction, and the third antenna array may be oriented to generate a beam in a third direction different from the first direction and the second direction.

According to an embodiment, the first received signal strength or the second received signal strength may include an SNR, an RSRP, an RSCP, a BRSRP, or an RSSI.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a first antenna array including a plurality of first antenna elements;
a second antenna array including a plurality of second antenna elements; and
a processor, wherein the processor is configured to:
measure first signal strengths for every a plurality of beam indexes by means of the first antenna array and the second antenna array;
determine second signal strengths for every the plurality of beam indexes by means of the first antenna array;
when a difference between the first signal strength and the second signal strength corresponding to a beam index selected among the plurality of beam indexes is greater than or equal to a specified first threshold, determine a beam index, the first signal strength of which is maximal, among the plurality of beam indexes; and
when the difference between the first signal strength and the second signal strength is less than the first threshold, determine a beam index, the second signal strength of which is maximal, among the plurality of beam indexes.

2. The electronic device of claim 1, wherein the signal strength includes a signal to noise ratio (SNR), a reference signals received power (RSRP), a received signal code power (RSCP), a BRSRP, or a received signal strength indicator (RSSI).

3. The electronic device of claim 1, wherein the plurality of first antenna elements include a patch antenna, and
wherein the plurality of second antenna elements include a dipole antenna.

4. The electronic device of claim 3, wherein the processor is configured to:
when the difference between the first signal strength and the second signal strength is less than the first threshold, identify whether all the plurality of beam indexes are selected; and
when all the plurality of beam indexes are selected, determine the beam index, the second signal strength of which is maximal, among the plurality of beam indexes.

5. The electronic device of claim 3, wherein the processor is configured to:
when the difference between the first signal strength and the second signal strength is less than the first threshold, identify whether a difference between the second signal strength of the selected beam index and the second signal strength of a previous beam index is greater than or equal to a specified second threshold;
when the difference between the second signal strength of the selected beam index and the second signal strength of the previous beam index is greater than or equal to the second threshold, determine the beam index, the second signal strength of which is maximal, among the plurality of beam indexes; and
when the difference between the second signal strength of the selected beam index and the second signal strength of the previous beam index is less than the second threshold, determine the selected beam index as a beam index, a signal strength of which is maximal.

6. The electronic device of claim 3, wherein the first antenna array includes antenna elements formed in a plurality of rows and antenna elements formed in a plurality of columns, and
wherein the processor is configured to:
when the difference between the first signal strength and the second signal strength is less than the first threshold, determine a first beam index group, a signal strength of which is maximal, among first beam index groups corresponding to antenna elements formed in row;
determine a second beam index group, a signal strength of which is maximal, among second beam index groups corresponding to antenna elements formed in column; and
determine a beam index, a signal strength of which is maximal, based on the determined first beam index group and the determined second beam index group.

7. The electronic device of claim 3, wherein the first antenna array includes antenna elements formed in a plurality of rows and antenna elements formed in a plurality of columns, and
wherein the processor is configured to:
when the difference between the first signal strength and the second signal strength is less than the first threshold, select one of first beam index groups corresponding to antenna elements formed in row;
select one of second beam index groups corresponding to antenna elements formed in column; and
when a signal strength of the selected first beam index group is greater than or equal to a specified third threshold and when a signal strength of the selected second beam index group is greater than or equal to a specified fourth threshold, determine a beam index, a signal strength of which is maximal, based on the selected first beam index group and the selected second beam index group.

8. The electronic device of claim 3, further comprising:
a third antenna array including a plurality of third antenna elements,
wherein the processor is configured to:
when the difference between the first signal strength and the second signal strength is less than the first threshold, select a beam index, a signal strength of which is maximal, in the first antenna array;
select a beam index, a signal strength of which is maximal, in the third antenna array; and
determine a beam index, a signal strength of which is maximal, between the beam index selected from the first antenna array and the beam index selected from the third antenna array.

9. An electronic device, comprising:
a housing;
an antenna structure including a first antenna array and a second antenna array; and
a wireless communication circuitry configured to be operatively connected with the first antenna array and the second antenna array and transmit or receive a signal having a frequency between 3 Gigahertz (GHz) and 100 GHz by forming a directional beam using at least a part of the first antenna array or the second antenna array,
wherein the wireless communication circuitry is configured to:
determine received signal strengths through a plurality of combinations of the first antenna array and the second antenna array;
select one of the combinations based on at least some of the received signal strengths;
determine a first received signal strength using the second antenna array, rather than the first antenna array, with respect to the selected combination;
determine a second received signal strength using the second antenna array, rather than the first antenna array, with respect to the selected combination; and
select one of the first antenna array and the second antenna array based on at least a portion of the first received signal strength and the second received signal strength.

10. The electronic device of claim 9, wherein the first antenna array is located on a first plane, and
wherein the second antenna array is located on a second plane different from the first plane.

11. The electronic device of claim 10, wherein the first antenna array includes a plurality of conductive plates, and
wherein the second antenna array includes a plurality of dipole antennas.

12. The electronic device of claim 11, wherein the first antenna array is oriented to generate a beam in a first direction, and
wherein the second antenna array is oriented to generate a beam in a second direction different from the first direction.

13. The electronic device of claim 12, wherein the first direction is substantially perpendicular to the second direction.

14. The electronic device of claim 9, wherein the first received signal strength or the second received signal strength includes an SNR, an RSRP, an RSCP, a BRSRP, or an RSSI.

15. The electronic device of claim 13, wherein the first antenna array includes antenna elements formed in a plurality of rows and antenna elements formed in a plurality of columns, and
wherein the wireless communication circuitry is configured to:
when a difference between the first received signal strength and the second received signal strength is less than a first threshold, determine a first beam index group, a signal strength of which is maximal, among first beam index groups corresponding to antenna elements formed in row;
determine a second beam index group, a signal strength of which is maximal, among second beam index groups corresponding to antenna elements formed in column; and
determine a beam index, a signal strength of which is maximal, based on the determined first beam index group and the determined second beam index group.

* * * * *